(12) United States Patent
Onda et al.

(10) Patent No.: US 6,961,199 B2
(45) Date of Patent: Nov. 1, 2005

(54) DISK UNIT AND TEMPERATURE CONTROL METHOD THEREOF

(75) Inventors: Ryuichi Onda, Kawasaki (JP); Naotoshi Katahara, Kawasaki (JP); Eiichi Ebihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 101 days.

(21) Appl. No.: 10/303,567

(22) Filed: Nov. 25, 2002

(65) Prior Publication Data

US 2003/0202274 A1 Oct. 30, 2003

(30) Foreign Application Priority Data

Apr. 30, 2002 (JP) .............................. 2002-128498

(51) Int. Cl.[7] .............................................. G11B 15/18
(52) U.S. Cl. ...................................................... 360/69
(58) Field of Search .............................. 360/69, 97.02, 360/97.03, 75, 59

(56) References Cited

U.S. PATENT DOCUMENTS

| 4,147,299 A | * | 4/1979 | Freeman ..................... 236/49.5 |
| 4,488,192 A | * | 12/1984 | Treseder ................... 360/97.03 |
| 5,603,570 A | * | 2/1997 | Shimizu ...................... 374/100 |
| 6,389,817 B1 | * | 5/2002 | Smith ........................... 62/3.2 |
| 6,486,660 B1 | * | 11/2002 | Luse et al. .................... 324/210 |
| 6,522,459 B1 | * | 2/2003 | Pease et al. ............. 359/341.4 |
| 6,603,619 B1 | * | 8/2003 | Kojima et al. ................. 360/59 |
| 6,603,628 B1 | * | 8/2003 | Gillis et al. .................... 360/75 |
| 6,654,130 B2 | * | 11/2003 | Berger et al. ............... 356/516 |

FOREIGN PATENT DOCUMENTS

| JP | 4-67387 | 3/1992 |
| JP | 2000-149463 | 5/2000 |
| JP | 2001-57010 | 2/2001 |

* cited by examiner

*Primary Examiner*—David Hudspeth
*Assistant Examiner*—Fred F. Tzeng
(74) *Attorney, Agent, or Firm*—Greer, Burns & Crain, Ltd.

(57) ABSTRACT

A disk unit for writing data in a given position on a disk and reading data written in the given position on the disk by using a head includes a temperature control unit for controlling a temperature of a body of the disk unit by heating or cooling the body of the disk unit. The disk unit detects the temperature dependence of a characteristic of a rotary mechanism unit including at least a spindle motor and a voice coil motor, based on position information included in servo information reproduced from the head or a value of a current of the spindle motor, and compares the detected characteristic with a predetermined value, and operates the temperature control unit, when the characteristic has been degraded, so as to suppress the degradation of the characteristic. A temperature control method, of the disk unit, by operating an MPU, or the like, of a computer is provided.

13 Claims, 9 Drawing Sheets

DISK UNIT AND TEMPERATURE CONTROL METHOD THEREOF

BACKGROUND OF THE INVENTION

1. Field of the Invention

The present invention relates to a disk unit for writing data in a given position on a disk, such as a magnetic disk, and for reading data written in the given position on the disk, using a head, and a temperature control method of the disk unit. More particularly, the present invention relates to a disk unit which is capable of automatically controlling the internal temperature of the disk unit, per se, and a temperature control method of the disk unit, for the purpose of improving the endurance, against relatively severe environment, and the quality of the disk unit.

2. Description of the Related Art

In general, a disk unit, such as a magnetic disk unit containing a magnetic disk (or hard disk), is operable in a predetermined temperature range but, if the internal temperature of the disk unit is out of a predetermined temperature range, certain errors may occur.

For this reason, the internal temperature of a conventional disk unit is detected by a temperature sensor (or, a combination of a temperature sensor and a humidity sensor) disposed in the disk unit, and when the detected temperature is out of the predetermined temperature range in which the disk unit is operable, the inside of the disk unit is heated by a heater or cooled by a motor-driven fan, or the like, so that the internal temperature of the disk unit is controlled to be within the predetermined temperature range (please refer to, for example, Japanese Unexamined Patent Publication (Kokai) Nos.4-67387, 2000-149463, and 2001-57010).

As described above, a conventional disk unit is arranged to control the internal temperature of the disk unit, on the basis of the temperature detected by a temperature sensor in the disk unit. In other words, the conventional disk unit is not configured so that the most adequate (or suitable) temperature control is carried out in terms of the characteristic of the main components in the disk unit, e.g., a spindle motor (usually called DCM (DC motor)) for driving a disk rotatably, a voice coil motor (usually abbreviated to VCM) for driving a head, and the like; or rather, the conventional disk unit has only a function of keeping the internal temperature of the disk within the operable range.

SUMMARY OF THE INVENTION

It is therefore an object of the present invention to provide a disk unit which is capable of implementing the most adequate temperature control of the disk unit by detecting the temperature dependence of the characteristic of the main components in the disk unit, e.g., a spindle motor, a voice coil motor, and the like, without using any temperature sensor, and also, to provide a temperature control method of the above disk unit.

In order to attain the above object, the present invention provides a disk unit comprising a spindle motor for driving a disk rotatably and a voice coil motor for driving a head so as to move it toward a given position on the disk between the inner peripheral portion of the disk and the outer peripheral portion of the disk, in which data is written in the given position on the disk and data written in the given position on the disk is read by using the head. The disk unit includes a temperature control unit for controlling the temperature of a body of the disk unit by heating or cooling the body of the disk unit, and the temperature dependence of a characteristic of a rotary mechanism unit, including at least the spindle motor and the voice coil motor, is detected, based on position information included in servo information reproduced from the head, or a value of a current of the spindle motor, and the detected characteristic is compared with a predetermined value, and the temperature control unit is operated, when the characteristic has been degraded, so as to suppress the degradation of the characteristic.

The disk unit is preferably arranged to stop when the disk unit has not recovered from the degradation of the characteristic even if the temperature control unit has been operated.

Furthermore, a preferred embodiment of the present invention is a disk unit comprising a spindle motor for driving a disk rotatably, in which data is written in a given position on the disk and data written in the given position on the disk is read by using a head that is driven so as to move it toward the given position on the disk between the inner peripheral portion of the disk and the outer peripheral portion of the disk. The disk unit includes a temperature control unit for controlling the temperature of a body of the disk unit by heating or cooling the body of the disk unit, and a degree of an eccentricity of the spindle motor at low temperature is detected, based on position information included in servo information reproduced from the head, or a value of a current of the spindle motor, and the detected degree of the eccentricity is compared with a predetermined value, and the temperature control unit is operated to control the temperature of the body of the disk unit, when the degree of the eccentricity is larger than the preset value, so that the degree of the eccentricity becomes equal to the predetermined value or smaller than the predetermined value.

Furthermore, another preferred embodiment of the present invention is a disk unit comprising a voice coil motor for driving a head so as to move it toward a given position on the disk between the inner peripheral portion of a disk and the outer peripheral portion of the disk, in which data is written in the given position on the disk and data written in the given position on the disk is read by using the head. The disk unit includes a temperature control unit for controlling the temperature of a body of the disk unit by heating or cooling the body of the disk unit, and it is determined whether or not the voice coil motor has become saturated at high temperature, based on a seek speed during a seek operation of the head, or a value of a current of the voice coil motor, and the temperature control unit is operated to control the temperature of the body of the disk unit, when the seek speed or the value of the current of the voice coil motor is smaller than the predetermined value, so that the seek speed or the value of the current of the voice coil motor becomes equal to the predetermined value or larger than the predetermined value.

Furthermore, another preferred embodiment of the present invention is a disk unit comprising a voice coil motor for driving a head so as to move it toward a given position on a disk between the inner peripheral portion of the disk and the outer peripheral portion of the disk, in which data is written in the given position on the disk and data written in the given position on the disk is read by using the head. The disk unit includes a temperature control unit for controlling the temperature of a body of the disk unit by heating or cooling the body of the disk unit, a load torque exerted on the voice coil motor at low temperature is detected, based on a value of a current of the voice coil motor, and the detected load torque is compared with a predetermined value, and the temperature control unit is operated to control the temperature of the body of the disk unit, when the load torque is larger than the predetermined value, so that the load torque becomes equal to the predetermined value or smaller than the predetermined value.

In any one of the above preferred embodiments, when the temperature control unit has been operated, if the degree of the eccentricity of the spindle motor, the seek speed, the value of the current of the voice coil motor, or the load torque on the voice coil motor has not come into a predetermined range, the disk unit stops.

In summary, a disk unit according to the present invention is arranged to directly detect the characteristic of the rotary mechanism unit including the main components, such as the spindle motor and the voice coil motor, without using any temperature sensor, to determine whether or not the above characteristic is within a predetermined range by the disk unit itself, and to control the internal temperature of the disk unit so that the characteristic of the rotary mechanism unit comes into the predetermined range, by utilizing the heating function or cooling function of the temperature control unit including a heater, a motor-driven fan, etc., provided in the disk unit and, thereby, the most suitable temperature control of the disk unit can be carried out in terms of the characteristic of the main components in the disk unit.

Consequently, a disk unit according to the present invention can always maintain the characteristic of the disk unit in the best condition, by controlling the internal temperature of the disk unit in accordance with a change in temperature of the characteristic, per se, of the rotary mechanism unit of the disk unit.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

The configuration, operation, etc., of a disk unit according to a preferred embodiment of the present invention are described below, with reference to the accompanying drawings (FIGS. 1 to 9).

Figure 1:
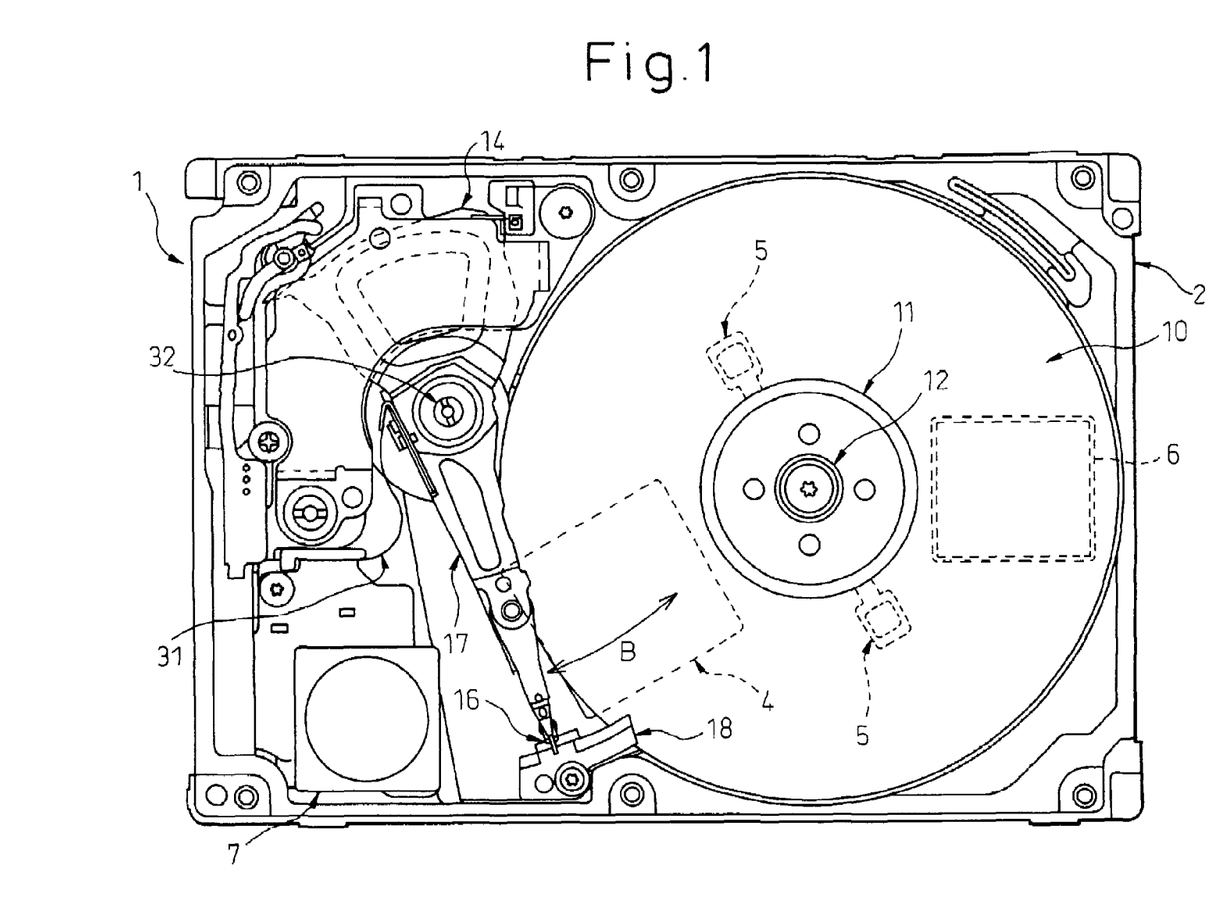
FIG. 1 is a plan view showing a schematic configuration of a disk unit according to a preferred embodiment of the present invention.
Figure 2:
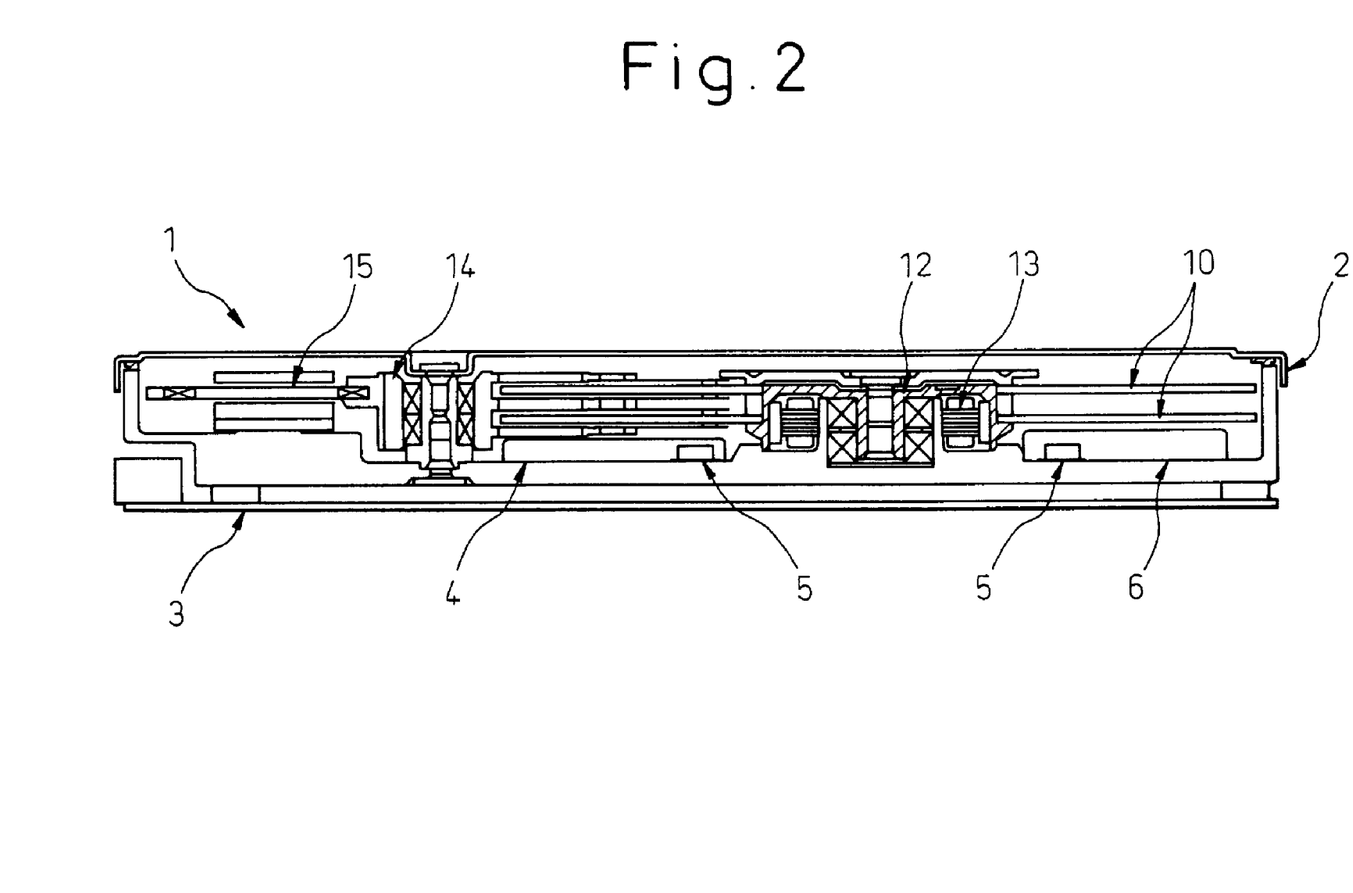
FIG. 2 is a front view showing heating components of a disk unit in FIG. 1.
Figure 3:
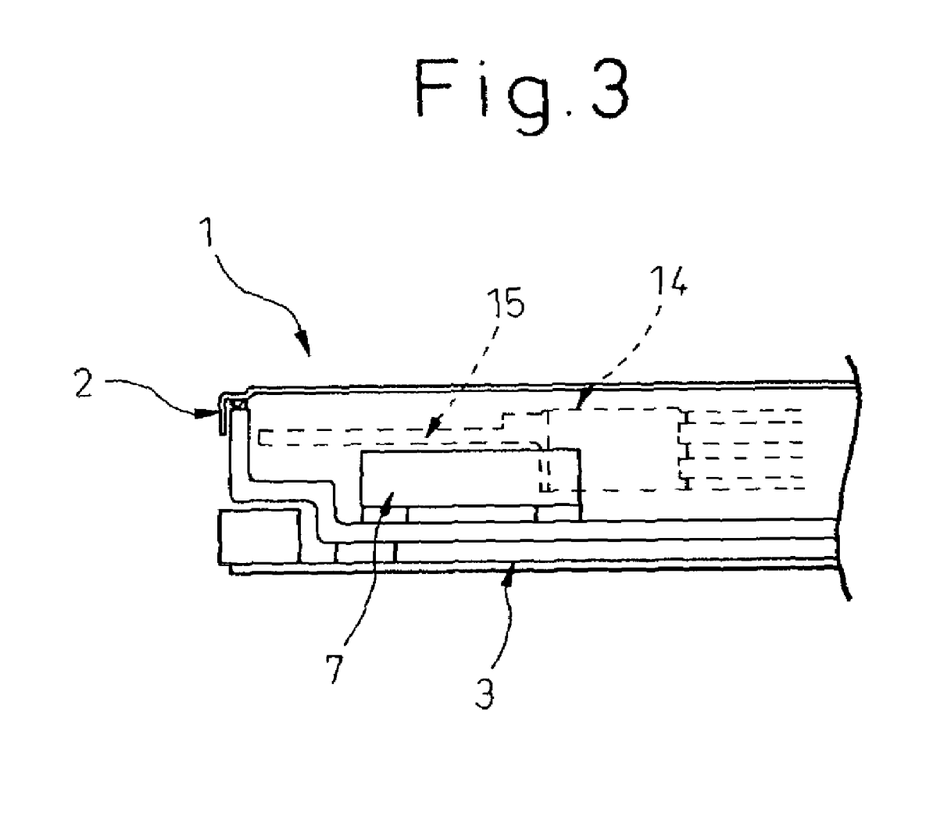
FIG. 3 is a front view showing cooling components of the disk unit in FIG. 1.

FIG. 1 is a plan view showing a schematic configuration of a disk unit according to a preferred embodiment of the present invention; FIG. 2 is a front view showing heating components of the disk unit in FIG. 1; FIG. 3 is a front view showing cooling components of the disk unit in FIG. 1; and FIG. 4 is a block diagram showing a control unit of the disk unit in FIG. 1.

In these drawings, a disk unit 1, such as a magnetic disk unit, having a head for writing data on a rotating disk 10, such as a hard disk, and reading data on the disk 10, is shown as an example of a disk unit according to a preferred embodiment of the present invention. With regard to the head, a read/write head, in which a reading head element and a writing head element are integrated into one unit, is used.

Figure 4:
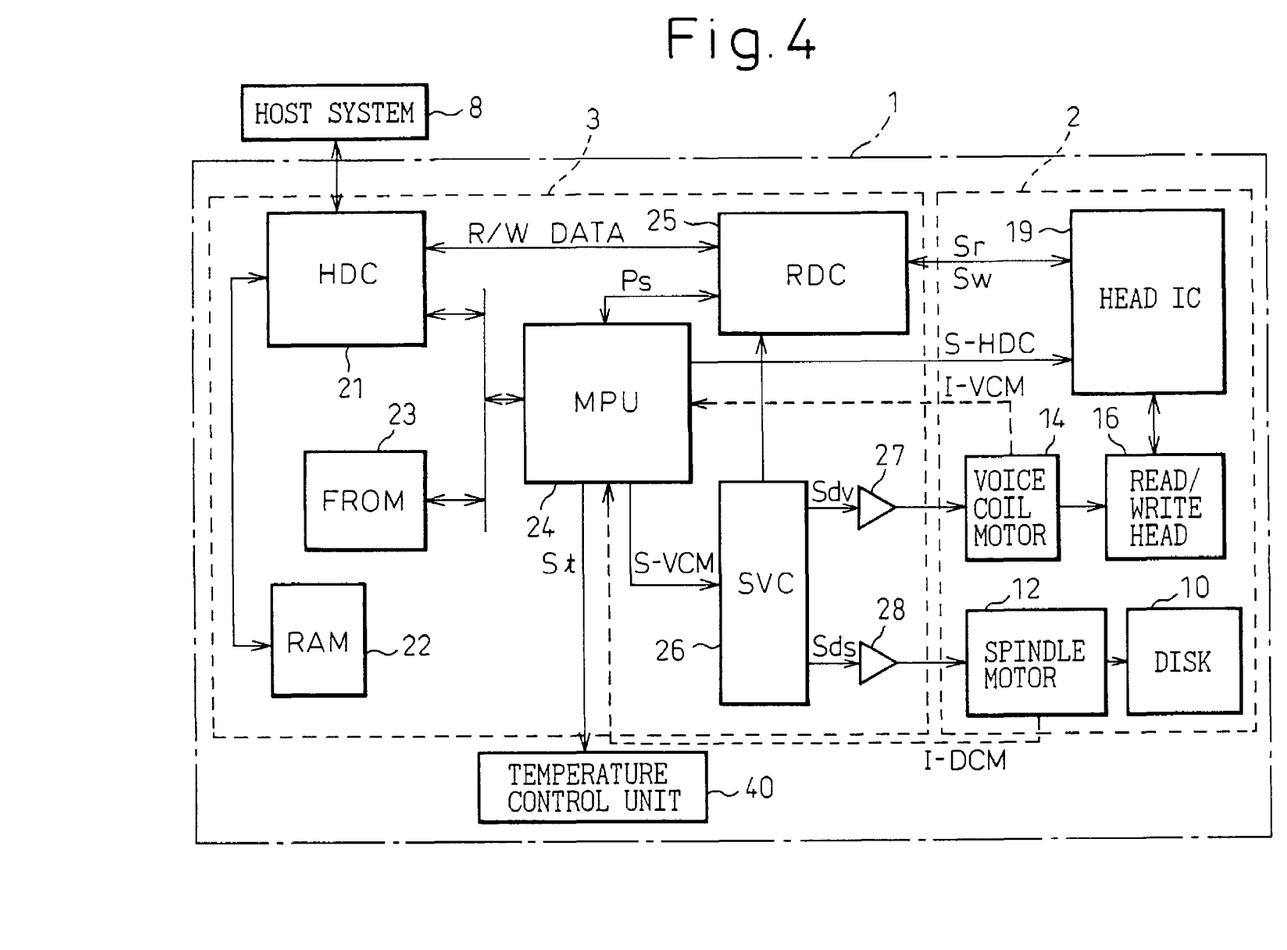
FIG. 4 is a block diagram showing a control unit of the disk unit in FIG. 1.

A mechanism section of the disk unit 1 is shown in FIGS. 1 to 3, which is used in various embodiments of the present invention as described later, and the control unit is shown in FIG. 4, which is used for controlling the operation of the disk unit 1. FIG. 2 is a cross-sectional view showing the heating components of the disk unit 1, and FIG. 3 is a cross-sectional partial view showing the cooling components of the disk unit 1. Hereinafter, the same elements as mentioned before will be indicated by using the same reference numerals.

The disk unit 1 shown in FIGS. 1 to 3 has a disk enclosure 2 which accommodates a single disk or a plurality of disks 10, a read/write head 16, a spindle motor 12, a voice coil motor 14, etc.; and a printed circuit assembly 3 on which a control unit for controlling the data write operation, the data read operation, etc., through the read/write head 16, are mounted. In the disk enclosure, a spindle 11, a spindle motor 12 which is coupled with the spindle 11, and a single rotary disk or a plurality of rotary disks 10, such as a hard disk rotated by the spindle motor 12, are provided coaxially. The spindle motor 12 is controlled by a servo control device 26 (usually abbreviated to SVC as shown in FIG. 4). The magnetic recording area on one surface or the other surface of the disk 10 has a plurality of tracks (or a plurality of cylinders), and data patterns corresponding to predetermined data have been written in given sections (also called "given sectors") on the tracks.

The term "cylinder" means an aggregation of a plurality of tracks in the vertical direction (i.e., a plurality of tracks arranged in the form of a cylinder), formed on a plurality of disks arranged in a stacked form, to which access can be made simultaneously by using a plurality of read/write heads.

In more detail, the magnetic recording area on any one of surfaces of a plurality of disks 10 of a disk unit in a servo-surface servo system using a dedicated servo surface consists of a servo surface area in which servo signal patterns corresponding to a servo signal for servo control are embedded in advance, and all of the magnetic recording areas on the remaining disks consist of data recording areas in which data patterns corresponding to predetermined data are created. On the other hand, the magnetic recording area on each of surfaces of a plurality of disks of a disk unit in a data-surface servo system using all the data surfaces consists of a data surface area in which data patterns are created and servo patterns are embedded in advance for every given portion of these data patterns. Recently, a disk unit in data-surface servo system using all the data surfaces tends to be generally used.

The disk unit 1 shown in FIGS. 1 to 3 also has a read/write head 16 for writing data in a given position in the magnetic recording area of a disk 10 and reading the data written in the given position in the above magnetic recording area. This read/write head 16 is mounted on one end part of the head-suspending arm 17. This arm 17 is driven so as to move toward the given position on the disk 10 between the inner peripheral portion of the disk 10 and the outer peripheral portion of the disk 10, by the voice coil motor 14 which is controlled by the servo control device 26 (see FIG. 4). Thus, access can be made to all of the data surface area, in which data has been written, in the magnetic recording area of the disk 10. A pivot bearing 32 is mounted on the central part of the voice coil motor 14 so that the arm 17 can be smoothly rotated in both directions around the pivot bearing 32.

For example, when the arm 17 is rotated in the direction of an arrow B by the voice coil motor 14, the read/write head 16 moves in the direction of the radius of the disk 10 to scan the designated tracks. The components including the voice coil motor 14 and the arm 17 to drive the read/write head 16 are collectively called a "head actuator". A flexible printed circuit board (usually abbreviated to FPC) 31 is fixed to the head actuator, and a servo signal Sdv (see FIG. 4) for controlling the voice coil motor 14 and the read/write head 16 is supplied from the FPC 31 to the voil coil motor 14.

A ramp mechanism unit 18 is disposed at the outer peripheral portion of the disk 10 and engaged with the end part of the arm 17 to keep the read/write head 16 away from the disk 10.

Furthermore, the disk unit has an interface connector (not shown) for connecting a control unit (see FIG. 4) of a printed circuit assembly 3 of a disk unit 1 and an external host system 8 (see FIG. 4) with each other.

In addition, a temperature control unit 40 (see FIG. 4) including a heater 4, a heat IC 5, a Peltier device 6, a motor-driven fan 7, etc., shown in FIG. 1, which are components representing the advantages of the preferred embodiments of the present invention, is provided in the empty space in the disk unit. The temperature control unit 40 is able to automatically control the temperature of the body of the disk unit by heating or cooling the body of the disk unit (in particular, a rotary mechanism unit such as the spindle motor 12 or the voice coil motor 14 in the disk unit).

In more detail, the body of the disk unit 1 may be heated by the heater 4 functioning as a heating element, the heat IC 5 supplying the predetermined current to the heater 4, or the Peltier device 6 having a heating function based on Peltier effect, etc., shown in FIG. 2. The temperature of the body of the disk unit may be controlled by heating the body of the disk unit by feeding the current in a certain direction through the heater 4 and heat IC 5, or the Peltier device 6, in accordance with a temperature control signal St (see FIG. 4) from the microprocessor unit 24 (usually abbreviated to MPU as shown in FIG. 4) of the disk unit 1.

The body of the disk unit may also be heated by feeding the current in a certain direction through a winding part having the stationary phase in the spindle motor winding section 13 or in a certain direction through the voice coil motor winding section 15. Furthermore, the body of the disk unit may also be heated by operating the control components (see FIG. 4) of the disk unit 1 at the maximum.

On the other hand, the body of the disk unit may be cooled by the motor-driven fan 7, or the Peltier device 6 having a cooling function based on Peltier effect, etc., as shown in FIG. 2 or FIG. 3. The temperature of the body of the disk unit may be controlled by cooling the body of the disk unit by operating the motor-driven fan 7, or feeding the current in a certain direction through the Peltier device 6, in accordance with a temperature control signal St (see FIG. 4) sent from the MPU 24 (see FIG. 4). The body of the disk unit may be cooled effectively by auxiliary utilizing cooling means, such as radiation fins.

Next, with reference to FIG. 4, the configuration of the control unit of the disk unit according to the preferred embodiment of the present invention will be described in detail.

As shown in FIG. 4, a reproducing signal read from the disk 10 by the read/write head 16 is supplied to the head IC 19 to be amplified by the head IC 19, and then supplied to the printed circuit assembly 3.

As shown in FIG. 4, a read channel (usually abbreviated to RDC) 25 for demodulating the reproducing signal Sr supplied from the head IC 19 into data information and servo information Ps, and a MPU 24 for controlling the overall operations related to the data read operation or the data write operation based on the servo information Ps output from the read channel 25, are mounted on the printed circuit assembly 3. Position information related to the track position of the read/write head 16 corresponding to the given track on the surface of the disk can be taken out of the servo information Ps.

In addition, on the printed circuit assembly 3 shown in FIG. 4, a hard disk controller (HDC) for controlling the operation of the disk unit 1 in accordance with the command issued from the host system 8 provided outside the disk unit 1, a RAM (random access memory) 22 for storing data that is to be read or written temporarily, a flash read-only memory (usually abbreviated to FROM as shown in FIG. 4) 23 for storing a program to execute the data read operation, data write operation, etc., and a servo control device 26 for controlling the spindle motor 12 and the voice coil motor 14, are mounted.

In the above configuration, when a command for the data write operation is issued from the host system 8, the MPU 24 is operated in accordance with the program previously stored in the flash ROM (FROM) 23 to send out a read channel control signal to the read channel 25. The read channel 25 sends out a read signal Sw to the head IC 19, based on the read/write data signal (R/W DATA). The head IC 19 amplifies the read signal Sw and sends out the amplified read signal to the read/write head 16.

On the other hand, when a command for the data read operation is issued from the host system 8, the MPU 24 is operated in accordance with the program previously stored in the flash ROM 23 to send out a hard disk control signal S-HDC to the head IC 19. The head IC 19 amplifies a reproducing signal output from the read/write head 16 and sends out the amplified reproducing signal to the read channel 25. The read channel 25 determines whether or not the reproducing signal has been read out from a right track position on the disk, based on a read/write data signal (R/W DATA), and sends out servo information Ps including position information about the right track position to the MPU 24.

Furthermore, the MPU 24 produces a VCM control signal S-VCM for controlling the voice coil motor 14, based on various control signals and servo information Ps sent from the host system 8, and sends out the produced VCM control signal S-VCM to the servo control device 26. A servo signal Sdv for the voice coil motor produced based on the VCM control signal S-VCM is supplied to the voice coil motor 14 through a driver 27. According to the servo signal Sdv, the voice coil motor 14 starts to be driven (the current I-VCM flows through the voice coil motor 14), and the operation for allowing the read/write head 16 to seek a predetermined track position, or the like, is carried out. At the same time, a servo signal Sds for the spindle motor produced based on the VCM control signal S-VCM is supplied to the spindle motor 12 through a driver 28. According to the servo signal Sds, the spindle motor 12 starts to be driven (a current I-DCM flows through the spindle motor 12) and rotates the disk 10.

The above operations of the control unit are substantially the same as the operations of the control unit of a conventional magnetic disk unit.

In the preferred embodiment of the present invention, the MPU 24 has a function of detecting the temperature dependence of the characteristic of the rotary mechanism unit including the spindle motor 12 and voice coil motor 14. The temperature dependence of the characteristic of the rotary mechanism unit is detected, based on the position information included in the servo information Ps reproduced and demodulated from the read/write head 16 through the read channel 25, or the value of the current supplied to the spindle motor 12. The MPU 24 also has a function of comparing the characteristic of the spindle motor 12 and the voice coil motor 14, detected in such a manner, with a predetermined value.

The predetermined value is preferably recorded in advance in a particular track position on the disk, or stored in advance in a storage device, such as the RAM 22 on the printed circuit assembly 3. The predetermined value may also be stored in a storage device, such as a RAM or a ROM contained in the MPU 24. Furthermore, when there are a plurality of disk units, the same predetermined value may be adapted for all of the disk units, or a most suitable predetermined value may be stored for each of the disk units in the corresponding disk unit.

When the characteristic of the spindle motor 12 or the voice coil motor 14 is out of a predetermined range at the high temperature side or the low temperature side, the MPU 24 determines that the characteristic of the spindle motor 12 or the voice coil motor 14 has been degraded owing to a change in the temperature in the disk unit, and sends out the temperature control signal St for suppressing the degradation of the characteristic to the temperature control unit 40.

According to this temperature control signal St, the heater 4, heat IC 5, Peltier device 6, or motor-driven fan 7 of the temperature control unit 40 starts to be operated, and the temperature of the body of the disk unit is automatically controlled so that the characteristic of the spindle motor 12 or the voice coil motor 14 comes into the predetermined range.

If the characteristic of the spindle motor 12 or the voice coil motor 14 has not recovered from the degradation of the above characteristic even if the heater 4, heat IC 5, Peltier device 6, or motor-driven fan 7 of the temperature control unit 40 has been operated, an alarm may be activated in accordance with the instructions from the MPU 24, and then the disk unit 1 may stop being operated. In addition, it may also be reported to the host system, whenever necessary, that the disk unit 1 has stopped being operated.

The program for temperature control stored in the flash ROM 23 on the printed circuit assembly 3 includes a step of detecting the temperature dependence of the characteristic of the rotary mechanism unit including at least the spindle motor 12 and the voice coil motor 14, based on the position information included in the servo information Ps reproduced from the read/write head 16 for writing data on the disk 10 and reading data from the disk 10 in the disk unit 1; a step of comparing the detected characteristic with a predetermined value; and a step of operating the temperature control unit 40 for heating or cooling the body of the disk unit, when the characteristic of the rotary mechanism unit has been degraded, so as to suppress the degradation of the characteristic.

In the preferred embodiment of the present invention, when the control unit shown in FIG. 4 is operated by using a computer readable storage medium (or recording medium), a storage medium (e.g., a disk 10, such as a hard disk in the disk unit 1) for storing a program for temperature control as described above is preferably used. A storage medium used in the above embodiment is not limited to the above-mentioned storage medium, but may be any one of various types of storage media, e.g., portable type storage media, such as a floppy disk and CD-ROM (compact disk read-only memory), and fixed type storage media.

In the above embodiment, the temperature of the body of the disk unit is automatically controlled, by directly detecting the characteristic of the rotary mechanism unit having the temperature dependence, including the spindle motor and the voice coil motor, and by operating the temperature control unit including the heater and the motor-driven fan so that the characteristic of the rotary mechanism unit is in a predetermined range. Thus, the performance of the disk unit may be stabilized in a relatively wide range of ambient temperatures, and the optimum characteristic of the disk unit may be obtained by controlling the temperature of the disk unit, based on the characteristic of the rotary mechanism unit. Furthermore, as temperature control corresponding to each of a plurality of disk units can be carried out, variations in characteristics of these disk units with respect to the change in temperature in each of these disk units can be reduced.

Next, various specific examples of the temperature control of a disk unit according to the above embodiment will be described with reference to FIGS. 5 to 8.

Figure 5:
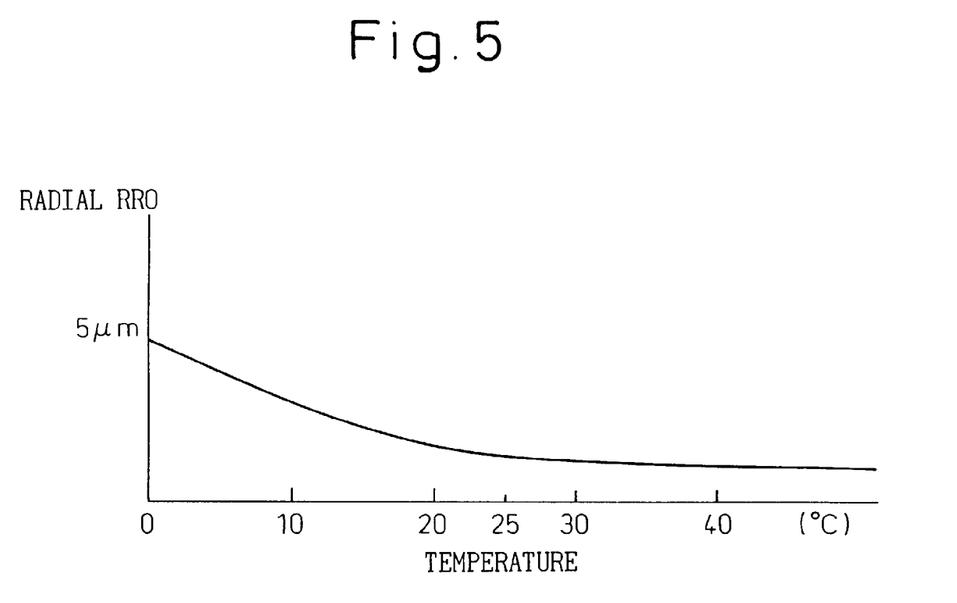
FIG. 5 is a graph showing a change in temperature of the RRO (repeatable run-out) of a spindle motor.

FIG. 5 shows a change in temperature of the repeatable run-out (RRO) of a spindle motor. With reference to FIG. 5, a first specific example of the temperature control of the disk unit is described below.

As shown in FIG. 5, the value of the RRO showing the degree of the eccentricity in the radial direction of the spindle motor 12 (see FIG. 4) depends on temperature. In general, the RRO at low temperature tends to be larger than that at normal temperature (typically, at 25° C.). One of the reasons for the above is that the viscosity of the oil in the ball bearing or the viscosity of the fluid in the fluid bearing increases with decreasing temperature.

In the first specific example, the MPU 24 (see FIG. 4) has a function of detecting the temperature dependence of the RRO of the spindle motor 12. This temperature dependence is detected based on the position information included in the servo information Ps reproduced and demodulated from the read/write head 16 (see FIG. 4) through the read channel 25 (see FIG. 4) (or the current supplied to the spindle motor 12). The MPU 24 also has a function of comparing the RRO of the spindle motor 12, detected in such a manner, with a predetermined value.

The predetermined value is preferably recorded in advance in a particular track position on the disk, or stored in advance in a storage device, such as the RAM 22 on the printed circuit assembly 3 (see FIG. 4). The predetermined value may also be stored in a storage device, such as a RAM or a ROM contained in the MPU 24.

When the RRO of the spindle motor 12 is larger than the predetermined value at the low temperature side, the MPU 24 sends out the temperature control signal St for controlling the value of the RRO to reach the predetermined value or a value smaller than the predetermined value, to the temperature control unit 40.

According to this temperature control signal St, the heater 4 (see FIG. 1), heat IC 5 (see FIG. 1), or Peltier device 6 (see FIG. 1) having the heating function in the temperature control unit 40 starts to be operated, and the temperature of the body of the disk unit is automatically controlled so that the RRO of the spindle motor 12 becomes equal to the predetermined value or smaller than the predetermined value. As a result of this, the temperature is controlled so that the value of the position information included in the servo information Ps comes into the predetermined range, and thereby, the position of the read/write head 16 on a designated track can be decided assuredly and stably.

If the RRO of the spindle motor 12 has not recovered to the predetermined value or the value smaller than the predetermined value even if the heater 4, heat IC 5, or Peltier device 6 of the temperature control unit 40 has been operated, an alarm may be activated in accordance with the instructions from the MPU 24 and, then, the disk unit 1 may stop being operated. In addition, it may also be reported to the host system 8, whenever necessary, that the disk unit 1 has stopped being operated.

The program for temperature control stored in the flash ROM 23 on the printed circuit assembly 3 (see FIG. 4) includes a step of detecting the value of the RRO showing the degree of the eccentricity of the spindle motor 12 at low temperature, based on the position information included in the servo information reproduced from the read/write head 16 for writing data on the disk 10 of the disk unit and reading data from the disk 10 (or the value of the current of the spindle motor 12); a step of comparing the detected RRO with a predetermined value; and a step of operating the heating components of the temperature control unit 40 for heating or cooling the body of the disk unit to decrease the value of the RRO to the predetermined value or the value smaller than the predetermined value when the value of the RRO is larger than the predetermined value.

Figure 6:
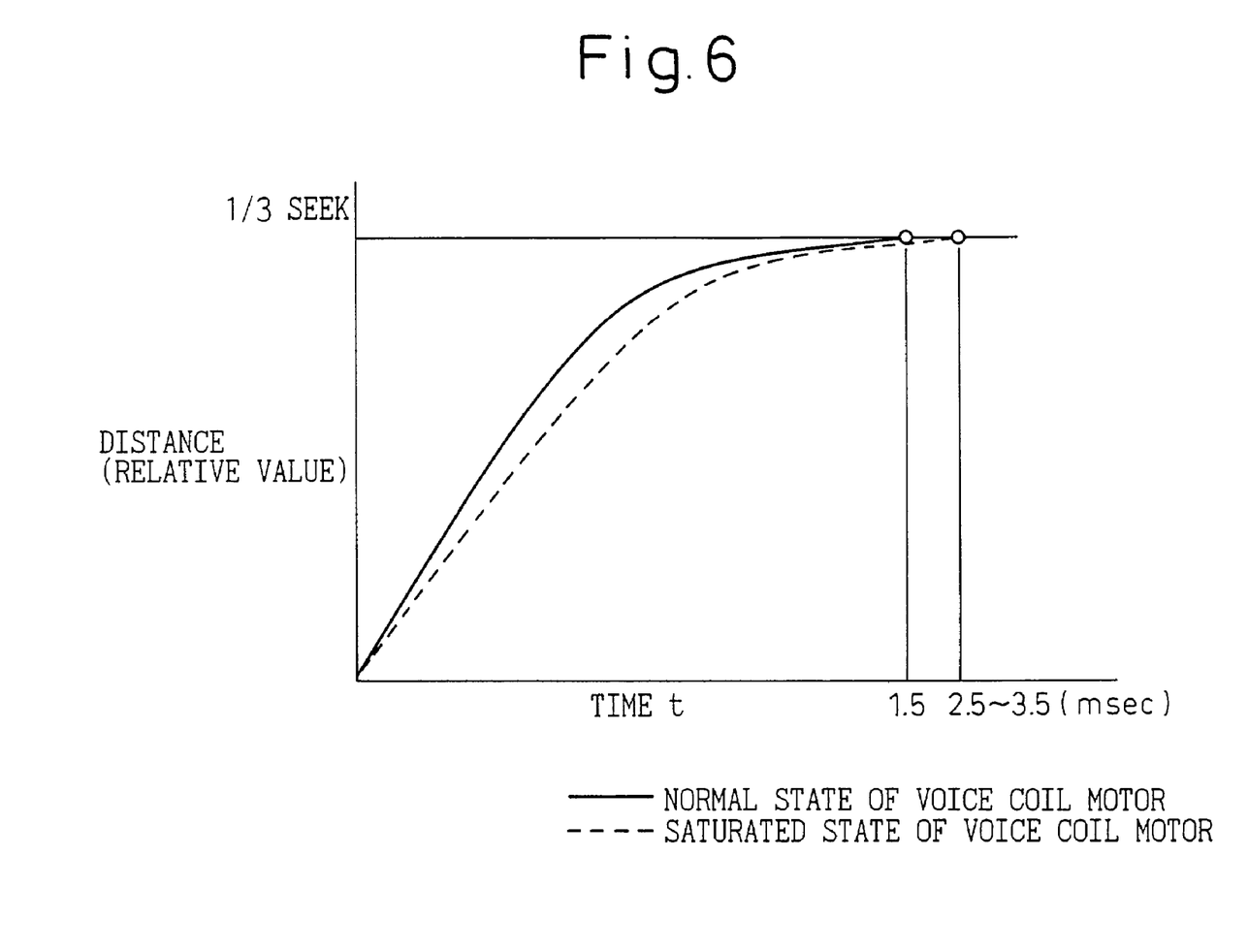
FIG. 6 is a graph showing the difference in the seek time between the saturated state and the normal state of a voice coil motor.
Figure 7:
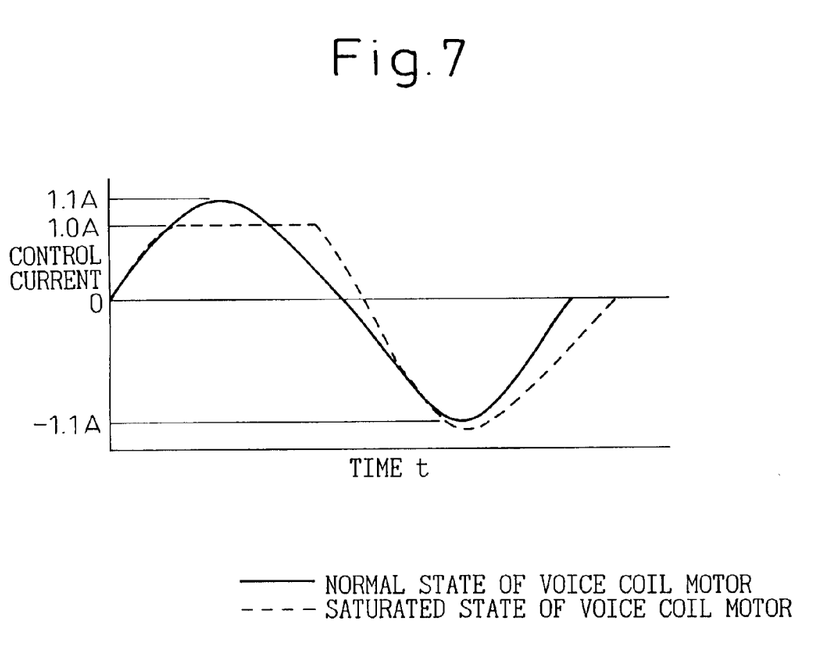
FIG. 7 is a graph showing the difference in the control current between the saturated state and the normal state of the voice coil motor.

FIG. 6 shows the difference in the seek time between the saturated state and the normal state of the voice coil motor; and FIG. 7 shows the difference in the control current between the saturated state and the normal state of the voice coil motor. With reference to FIGS. 6 and 7, a second specific example of the temperature control of the disk unit is described below.

As shown in FIGS. 6 and 7, when the voice coil motor 14 is continued to be used for a seek operation at high temperature with high frequency of time, the control current of the voice coil motor 14 may become saturated and a seek speed may become lower. For example, in FIG. 7, the control current is also normal even at 1.1 A at low temperature (shown with a solid line), but has been already saturated at 1.0 A at high temperature (shown with a broken line). When the control current of the voice coil motor 14 is saturated, it is obvious from FIG. 6 that the seek time associated with the seek operation in the saturated state is longer than the seek time at the normal state. For example, in FIG. 6, the seek time for one-third (⅓) of the full seek distance for completing the seek operation at low temperature (shown with a solid line) is 1.5 msec, while the seek time for one-third (⅓) of the full seek distance for completing the seek operation at high temperature (shown with a broken line) is 2.5 to 3.5 msec. Such a long seek time makes the response of the seek operation of the read/write head 16 relatively slow, and also makes the access to the data on the surface of the disk relatively slow.

In the second specific example, the MPU 24 (see FIG. 4) has a function of calculating a seek speed during the seek operation of the read/write head 16, on the basis of the position information included in the servo information Ps reproduced and demodulated from the read/write head 16 (see FIG. 4) through the read channel 25 (see FIG. 4), and the seek time, and determining whether or not the voice coil motor 14 has been saturated, based on the calculated seek speed. It may also be determined by calculating the control current of the voice coil motor 14 whether or not the voice coil motor 14 has been saturated. Further, the MPU 24 has a function of comparing the calculated seek speed (or the value of the control current of the voice coil motor 14) with a predetermined value, in order to correctly determine whether or not the voice coil motor has been saturated.

The predetermined value is preferably recorded in advance in a particular track position on the disk, or stored in advance in a storage device, such as the RAM 22 on the printed circuit assembly 3 (see FIG. 4). The predetermined value may also be stored in a storage device, such as a RAM or a ROM contained in the MPU 24.

When the seek speed is smaller than the predetermined value at the high temperature side, the MPU 24 sends out the temperature control signal St for controlling the seek speed to become the predetermined value, or the value larger than the predetermined value, to the temperature control unit 40.

According to this temperature control signal St, the Peltier device 6 (see FIG. 1) or motor-driven fan 7 (see FIG. 1) having a cooling function in the temperature control unit 40 starts to be operated, and the temperature of the body of the disk unit is automatically controlled so that the seek speed during the seek operation of the read/write head 16 becomes equal to the predetermined value or larger than the predetermined value. As a result of this, the temperature is controlled so that the seek speed becomes equal to the predetermined value or larger than the predetermined value, and thereby, the voice coil motor 12 can be prevented from becoming saturated.

If the seek speed during a seek operation of the read/write head 16 has not recovered to the predetermined value or the value larger than the predetermined value even if the Peltier device 6 or motor-driven fan 7 of the temperature control unit 40 has been operated, an alarm may be activated in accordance with the instructions from the MPU 24 and, then, the disk unit 1 may stop being operated. In addition, it may also be reported to the host system 8, whenever necessary, that the disk unit 1 has stopped being operated.

The program for temperature control stored in the flash ROM 23 on the printed circuit assembly 3 (see FIG. 4) includes a step of determining whether or not the voice coil motor 14 has been saturated at high temperature, based on the seek speed of the seek operation of the read/write head 16 for writing data on the disk 10 of the disk unit 1 and reading data from the disk 10 (or the value of the control current of the voice coil motor 14); and a step of operating the cooling components of the temperature control unit 40 for heating or cooling the body of the disk unit to increase the seek speed (or the value of the control current of the voice coil motor 14) to the predetermined value or the value larger than the predetermined value when the seek speed (or the value of the control current of the voice coil motor 14) is smaller than the predetermined value.

Figure 8:
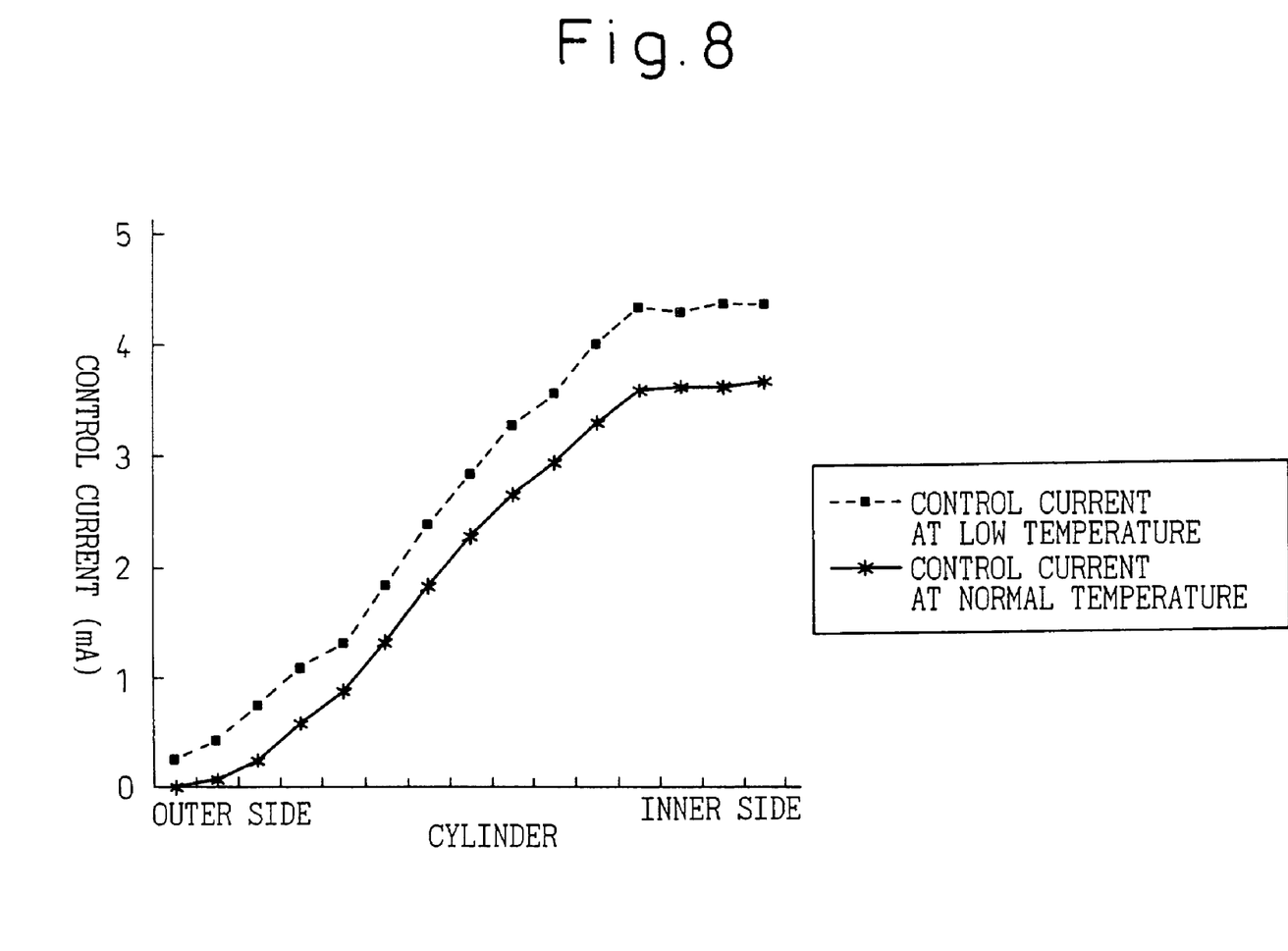
FIG. 8 is a graph showing a change in temperature of an external force exerted on the voice coil motor by a FPC.

FIG. 8 shows a change in temperature of an external force exerted on the voice coil motor by the FPC. With reference to FIG. 8, a third specific example of the temperature control of the disk unit will be described below.

In general, the flexible printed circuit board (FPC) 31 (see FIG. 1) fixed to the head actuator is arranged to exert an external force on the voice coil motor 14 (see FIG. 1). Further, the pivot bearing 32 (see FIG. 1) disposed on the central part of the head actuator also is arranged to exert an external force on the voice coil motor 14. In other words, these mechanical components, such as the flexible printed circuit board 31 and the pivot bearing 32, are arranged to exert a load torque on the voice coil motor 14.

As shown in FIG. 8, the load torque from the flexible printed circuit board 31 or the pivot bearing 32 may be converted to the control current of the voice coil motor 14 at the time when the read/write head 16 is positioned on a designated track (i.e., positioned in an on-track condition) or is seeking a track. It is obvious from the structure of the head actuator in FIG. 1, that the load torque in the case in which the read/write head 16 is positioned on the inner peripheral portion of the disk 10 is larger than the load torque in the case in which the read/write head 16 is positioned on the outer peripheral portion of the disk 10.

Furthermore, as shown in FIG. 8, the load torque by the flexible printed circuit board 31 or the pivot bearing 32 (i.e., the control current of the voice coil motor 14 at the time when the read/write head 16 is positioned on a designated track or is seeking a track) varies in accordance with the temperature dependence of the mechanical characteristic of the flexible printed circuit board 31 or the pivot bearing 32. In general, when the read/write head is positioned on the inner peripheral portion of the disk 10, the load torque at low temperature (e.g., control current of 4.2 mA) tends to be larger than the load torque at normal temperature (e.g., control current of 3.7 mA). One of the reasons for the above is that the flexible printed circuit board becomes more inflexible as the ambient temperature decreases.

In the third specific example, the MPU 24 (see FIG. 4) has a function of detecting the temperature dependence of the load torque exerted on the voice coil motor 14 as the value of the control current of the voice coil motor 14 at the time when the read/write head 16 is positioned on a designated track or is seeking a track. The MPU 24 also has a function of comparing the control current of the voice coil motor 14 corresponding to the detected load torque with a predetermined value.

The predetermined value is recorded in advance in a particular track on the disk, or stored in advance in a storage device, such as the RAM 22 on the printed circuit assembly 3 (see FIG. 4). The predetermined value may also be stored in a storage device, such as a RAM or ROM contained in the MPU 24.

When the control current of the voice coil motor 14 is larger than the predetermined value at the low temperature side, the MPU determines that the load torque exerted on the voice coil motor is larger than a predetermined upper limit value, and sends out a temperature control signal St for controlling the load torque to become the upper limit value or the value smaller than the upper limit value, to the temperature control unit 40.

According to this temperature control signal St, the heater 4 (see FIG. 1), heat IC 5 (see FIG. 1), or Peltier device 6 (see FIG. 1) having a heating function in the temperature control unit 40 starts to be operated, and the temperature of the body of the disk unit is automatically controlled so that the control current of the voice coil motor 14 corresponding to the load torque becomes equal to the predetermined value or smaller than the predetermined value. As a result of this, the control current of the voice coil motor 14 is controlled to become the predetermined value or the value smaller than the predetermined value, and thereby, the variation of the load torque can be suppressed.

If the control current of the voice coil motor 14 corresponding to the load torque has not recovered to the predetermined value or the value smaller than the predetermined value even if the heater 4, heat IC 5, or Peltier device 6 of the temperature control unit 40 has been operated, an alarm may be activated in accordance with the instructions from the MPU 24 and, then, the disk unit 1 may stop being operated. In addition, it may also be reported to the host system 8, whenever necessary, that the operation of the disk unit 1 has stopped being operated.

The program for temperature control stored in the flash ROM 23 on the printed circuit assembly 3 includes a step of detecting the load torque exerted on the voice coil motor at low temperature, based on the value of the control current of the voice coil motor 14 in the disk unit 1; a step of comparing the detected load torque (or the corresponding value of the control current of the voice coil motor 14) with a predetermined value; and a step of operating the temperature control unit 40 for heating or cooling the body of the disk unit to control the temperature of the body of the disk unit, when it is determined that the load torque is larger than the predetermined value, so that the load torque becomes equal to the predetermined value or smaller than the predetermined value.

Figure 9:
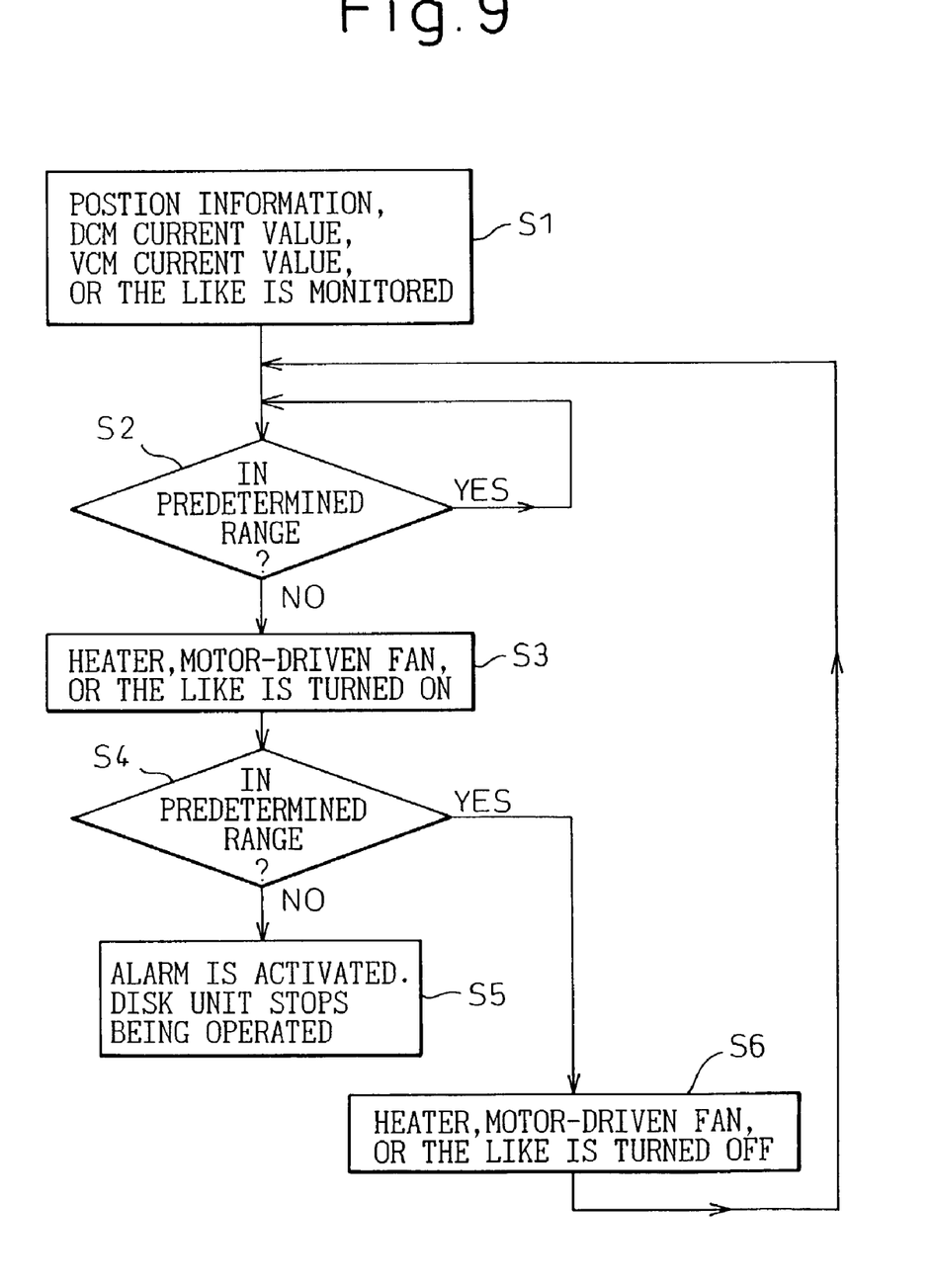
FIG. 9 is a flow chart for explaining the temperature control method of the disk unit in FIG. 1.

FIG. 9 is a flow chart for explaining the temperature control method of a disk unit according to the preferred embodiment of the present invention. This flow chart contains all of the above first to third specific examples. According to this flow chart, the procedure of carrying out the temperature control methods of the disk unit by operating the MPU or a CPU (central processing unit) will be explained.

In the disk unit according to the preferred embodiment of the present invention, at step S1 shown in FIG. 9, position information included in servo information reproduced from the read/write head, the value of the control current of the spindle motor (DCM-current value), or the value of the control current of the voice coil motor (VCM-current value) is monitored at predetermined time intervals.

When the position information, the control current of the spindle motor, or the control current of the voice coil motor is out of a predetermined range (step S2), the heater having a heating function, the motor-driven fan having a cooling function, or the like, in the temperature control unit is turned on (i.e., changed from the OFF state to the ON state) (step S3). The heater, the motor-driven fan, or the like, of the temperature control unit continues to be operated until the position information, the control current of the spindle motor, or the control current of the voice coil motor is in the predetermined range.

When the position information, the control current of the spindle motor, or the control current of the voice coil motor is in the predetermined range (step S4), the heater, the motor-driven fan, or the like, in the temperature control unit is turned off (i.e., changed from the ON state to the OFF state) (step S6).

On the other hand, if the control current of the spindle motor, or the control current of the voice coil motor is not in the predetermined range even if the heater, the motor-driven fan, or the like, in the temperature control unit has been operated (step S4), an alarm is activated in accordance with the instructions from a MPU, a CPU, or the like and, then, the disk unit 1 stops being operated (step S5). Thus, damage to the disk unit can be prevented. In addition, it is reported to the host system, whenever necessary, that the disk unit has stopped being operated.

Such procedure of carrying out the temperature control method of the disk unit may be easily realized by using software of a computer. Thus, in the embodiment of the present invention, the most suitable temperature control of the disk unit may be carried out only by previously providing the temperature control unit including a heater, motor-driven fan, etc., in the empty space in the disk unit, without substantially increasing the hardware of the computer.

As described above, a disk unit according to each of the typical embodiments of the present invention directly detects the characteristic of a rotary mechanism unit, including a spindle motor and a voice coil motor, without the use of any temperature sensor, and determines whether or not the characteristic is in a predetermined range in the disk unit itself. The disk unit controls the internal temperature of the disk unit, if the above characteristic is out of the predetermined range, so that the characteristic is in the predetermined range by utilizing the heating function or cooling function of the temperature control unit including a heater, a motor-driven fan, etc., provided in the disk unit, and thereby, the most suitable temperature control of the disk unit can be carried out.

Consequently, the disk unit can always maintain the characteristic of the disk unit in the best condition, by controlling the internal temperature of the disk unit in accordance with a change in temperature of the characteristic, per se, of the rotary mechanism unit of the disk unit.

What is claimed is:

1. A disk unit comprising a spindle motor for driving a disk rotatably and a voice coil motor for driving a head so as to move it toward a given position on said disk between the inner peripheral portion of said disk and the outer peripheral portion of said disk, in which data is written in the given position on said disk and data written in the given position on said disk is read by using said head, said disk unit including:
a temperature control unit for controlling the temperature of a body of the disk unit by heating or cooling said body of said disk unit, wherein the temperature dependence of a characteristic of a rotary mechanism unit, including at least said spindle motor and said voice coil motor, is detected, based on position information included in servo information reproduced from said head, or a value of a current of said spindle motor, and the detected characteristic is compared with a predetermined value, and said temperature control unit is operated, when said characteristic has been degraded, so as to suppress the degradation of said characteristic, wherein said disk unit stops when said disk unit has not recovered from the degradation of said characteristic even if said temperature control unit has been operated.

2. A disk unit comprising a spindle motor for driving a disk rotatably, in which data is written in a given position on said disk and data written in the given position on said disk is read by using a head that is driven so as to move it toward the given position on said disk between the inner peripheral portion of said disk and the outer peripheral portion of said disk, said disk unit including:
a temperature control unit for controlling the temperature of a body of said disk unit by heating or cooling said body of said disk unit, wherein a degree of an eccentricity of said spindle motor at low temperature is detected, based on position information included in servo information reproduced from said head, or a value of a current of said spindle motor, the detected degree of said eccentricity is compared with a predetermined value, and said temperature control unit is operated to control the temperature of said body of said disk unit, when said degree of said eccentricity is larger than said predetermined value, so that said degree of said eccentricity becomes equal to said predetermined value or smaller than said predetermined value.

3. A disk unit as set forth in claim 2, wherein said disk unit stops when said degree of said eccentricity has not become equal to said predetermined value or smaller than said predetermined value even if said temperature control unit has been operated.

4. A disk unit comprising a voice coil motor for driving a head so as to move it toward a given position on a disk between the inner peripheral portion of a disk and the outer peripheral portion of said disk, in which data is written in the given position on said disk and data written in the given position on said disk is read by using said head, said disk unit including:
a temperature control unit for controlling the temperature of a body of said disk unit by heating or cooling said body of said disk unit, wherein it is determined whether or not said voice coil motor has become saturated at high temperature, based on a seek speed during a seek operation of said head, or a value of a current of said voice coil motor, and said temperature control unit is operated to control the temperature of said body of said disk unit, when said seek speed or said value of said current of said voice coil motor is smaller than a predetermined value, so that said seek speed or said value of said current of said voice coil motor becomes equal to said predetermined value or larger than said predetermined value, wherein said disk unit stops when said seek speed or said value of said current of said voice coil motor has not become equal to said predetermined value or larger than said predetermined value even if said temperature control unit has been operated.

5. A disk unit comprising a voice coil motor for driving a head so as to move it toward a given position on said disk between the inner peripheral portion of a disk and the outer peripheral portion of said disk, in which data is written in the given position on said disk and data written in the given position on said disk is read by using said head, said disk unit including:
a temperature control unit for controlling the temperature of a body of said disk unit by heating or cooling said body of said disk unit, wherein a load torque exerted on said voice coil motor at low temperature is detected, based on a value of a current of said voice coil motor, and the detected load torque is compared with a predetermined value, and said temperature control unit is operated to control the temperature of said body of said disk unit, when said load torque is larger than said predetermined value, so that said load torque becomes equal to said predetermined value or less than said predetermined value.

6. A disk unit as set forth in claim 5, wherein said disk unit stops when said load torque has not become equal to said predetermined value or smaller than said predetermined value even if said temperature control unit has been operated.

7. A temperature control method of a disk unit comprising the steps of:
detecting the temperature dependence of a characteristic of a rotary mechanism unit including at least a spindle motor and a voice coil motor, based on position information included in servo information reproduced from a head for writing data on a disk in said disk unit and for reading data on said disk, or a value of a current of said spindle motor;
comparing the detected characteristic with a predetermined value; and
operating a temperature control unit for heating or cooling a body of said disk unit, when said characteristic has been degraded, so as to suppress the degradation of said characteristic, wherein said disk unit stops when said disk unit has not recovered from the degradation of said characteristics even if said temperature control unit has been operated.

8. A temperature control method of a disk unit comprising the steps of:
   detecting a degree of an eccentricity of a spindle motor at low temperature, based on position information included in servo information reproduced from a head for writing data on a disk in said disk unit and for reading data on said disk, or a value of a current of said spindle motor;
   comparing the detected degree of said eccentricity with a predetermined value; and
   operating a temperature control unit for heating or cooling a body of said disk unit, to control the temperature of said body of said disk unit, when said degree of said eccentricity is larger than said predetermined value, so that said degree of said eccentricity becomes equal to said predetermined value or smaller than said predetermined value.

9. A temperature control method of a disk unit comprising the steps of:
   determining whether or not a voice coil motor has become saturated at high temperature, based on a seek speed during a seek operation of a head for writing data on a disk in said disk unit and for reading data on said disk, or a value of a current of said voice coil motor; and
   operating a temperature control unit for heating or cooling a body of said disk unit, to control the temperature of said body of said disk unit, when said seek speed or said value of said current of said voice coil motor is smaller than a predetermined value, so that said seek speed or said value of said current of said voice coil motor becomes equal to said predetermined value or larger than the predetermined value.

10. A temperature control method of a disk unit comprising the steps of:
    detecting a load torque exerted on a voice coil motor in said disk unit at low temperature, based on a value of a current of said voice coil motor;
    comparing the detected load torque with a predetermined value; and
    operating a temperature control unit for heating or cooling a body of said disk unit, to control the temperature of said body of said disk unit, when said load torque is larger than said predetermined value, so that said load torque becomes equal to said predetermined value or smaller than said predetermined value.

11. A computer readable storage medium for storing a program which allows a computer to execute the steps of:
    detecting a degree of an eccentricity of a spindle motor at low temperature, based on position information included in servo information reproduced from a head for writing data on a disk in a disk unit and for reading data on said disk, or a value of a current of said spindle motor;
    comparing the detected degree of said eccentricity with a preset value; and
    operating a temperature control unit for heating or cooling a body of said disk unit, to control the temperature of said body of the disk unit, when said degree of said eccentricity is larger than said predetermined value, so that said degree of said eccentricity becomes equal to said predetermined value or smaller than said predetermined value.

12. A computer readable storage medium for storing a program which allows a computer to execute the steps of:
    determining whether or not a voice coil motor has become saturated at high temperature, based on a seek speed during a seek operation of a head for writing data on a disk in a disk unit and for reading data on said disk, or a value of a current of said voice coil motor; and
    operating a temperature control unit for heating or cooling a body of said disk unit, to control the temperature of said body of said disk unit, when said seek speed or said value of said current of said voice coil motor is smaller than a predetermined value, so that said seek speed or said value of said current of said voice coil motor becomes equal to said predetermined value or larger than said predetermined value.

13. A computer readable storage medium for storing a program which allows a computer to execute the steps of:
    detecting a load torque exerted on a voice coil motor in a disk unit at low temperature, based on a value of a current of said voice coil motor;
    comparing the detected load torque with a predetermined value; and
    operating a temperature control unit for heating or cooling a body of said disk unit, to control the temperature of said body of said disk unit, when said load torque is larger than said predetermined value, so that said load torque becomes equal to said predetermined value or smaller than said predetermined value.

* * * * *